United States Patent
Lee

(10) Patent No.: US 12,199,830 B2
(45) Date of Patent: Jan. 14, 2025

(54) METHOD AND SYSTEM FOR PROVIDING VIRTUAL INTERFACE BY USING STAR NETWORK

(71) Applicant: DABIDA CORP., Anyang-si (KR)

(72) Inventor: Eunseung Lee, Gwangju (KR)

(73) Assignee: DABIDA CORP., Anyang-si (KR)

( * ) Notice: Subject to any disclaimer, the term of this patent is extended or adjusted under 35 U.S.C. 154(b) by 19 days.

(21) Appl. No.: 18/268,609

(22) PCT Filed: Dec. 10, 2021

(86) PCT No.: PCT/KR2021/018776
§ 371 (c)(1),
(2) Date: Jun. 21, 2023

(87) PCT Pub. No.: WO2022/139284
PCT Pub. Date: Jun. 30, 2022

(65) Prior Publication Data
US 2024/0048453 A1    Feb. 8, 2024

(30) Foreign Application Priority Data

Dec. 23, 2020   (KR) .................... 10-2020-0181520

(51) Int. Cl.
| | |
|---|---|
| G06F 15/173 | (2006.01) |
| H04L 12/44 | (2006.01) |
| H04L 41/12 | (2022.01) |
| H04L 67/1061 | (2022.01) |
| H04L 69/14 | (2022.01) |
| H04W 8/00 | (2009.01) |

(52) U.S. Cl.
CPC ............. *H04L 41/12* (2013.01); *H04L 12/44* (2013.01); *H04L 67/107* (2013.01); *H04L 69/14* (2013.01); *H04W 8/005* (2013.01)

(58) Field of Classification Search
CPC ....... H04L 41/12; H04L 12/44; H04L 67/107; H04L 69/14; H04L 43/0811; H04L 67/1046; H04L 69/18; H04W 8/005
USPC ...................................................... 709/223
See application file for complete search history.

(56) References Cited

U.S. PATENT DOCUMENTS

| | | | |
|---|---|---|---|
| 6,347,336 B1 * | 2/2002 | Song ....................... | H04L 41/12 370/254 |
| 11,323,880 B2 * | 5/2022 | Cho ..................... | H04W 48/16 |

FOREIGN PATENT DOCUMENTS

| | | |
|---|---|---|
| JP | 5429179 B2 | 2/2014 |
| KR | 10-2009-0063415 A | 6/2009 |
| KR | 10-2015-0043887 A | 4/2015 |

(Continued)

OTHER PUBLICATIONS

International Search Report in International Application No. PCT/KR2021/018776, dated Mar. 24, 2022, 2 pages.

*Primary Examiner* — Vivek Srivastava
*Assistant Examiner* — Karina J Garcia-Ching
(74) *Attorney, Agent, or Firm* — Park, Kim & Suh, LLC

(57) ABSTRACT

A method and system for providing virtual interface by using star network are provided in which a multi-link for continuously connecting peers up to a maximum number of connectable peers N after scanning all peers around a dongle is formed, and when a peer exceeding the maximum number of connectable peers N among the all peers exists, a extending connection is formed such that a virtual multi-link with a new peer is formed using the dongle and an already connected peer.

11 Claims, 4 Drawing Sheets

(56) References Cited

FOREIGN PATENT DOCUMENTS

| KR | 10-2016-0138547 A | 12/2016 |
|---|---|---|
| KR | 10-2018-0121178 A | 11/2018 |

\* cited by examiner

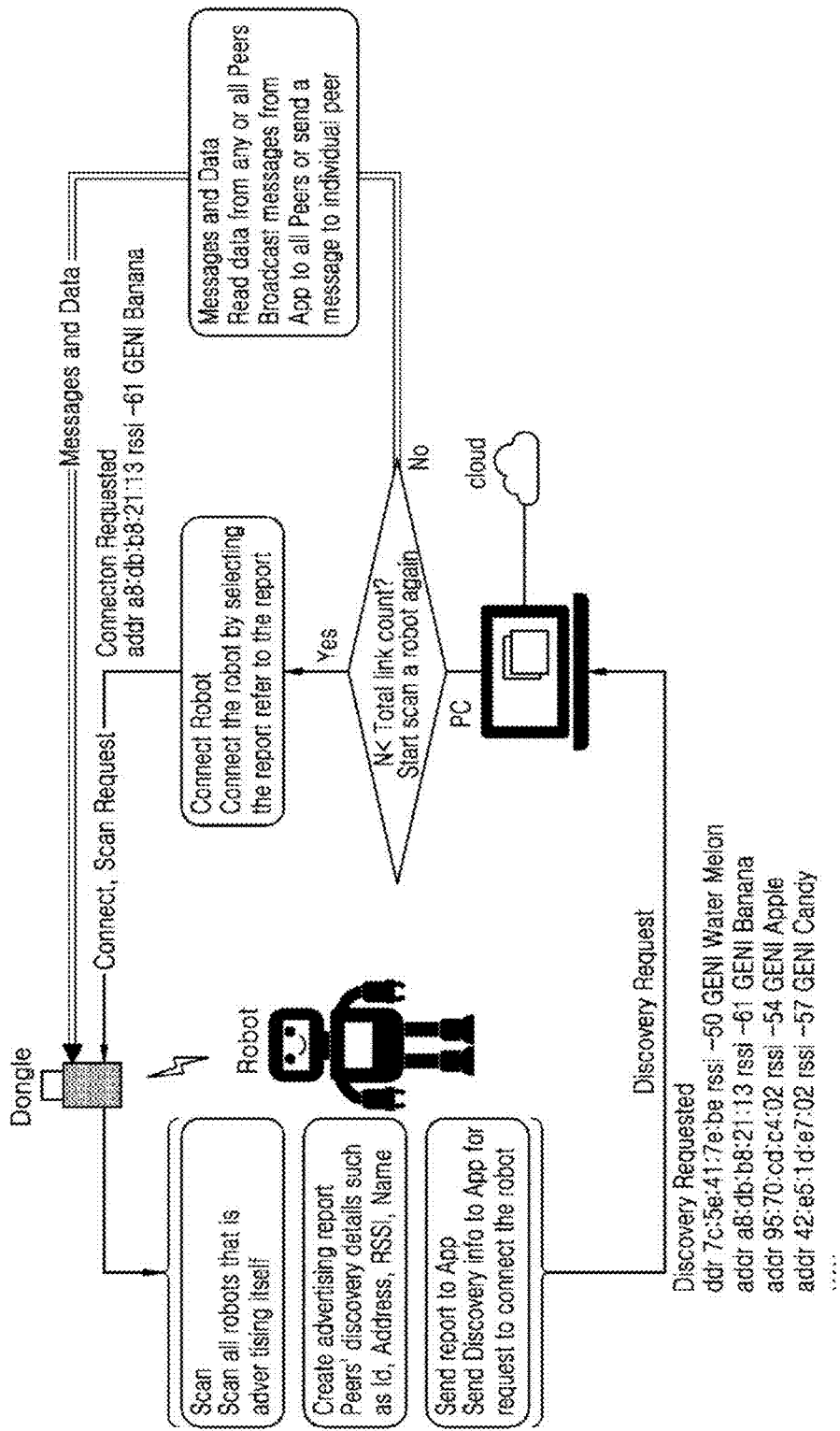
[Figure 1]

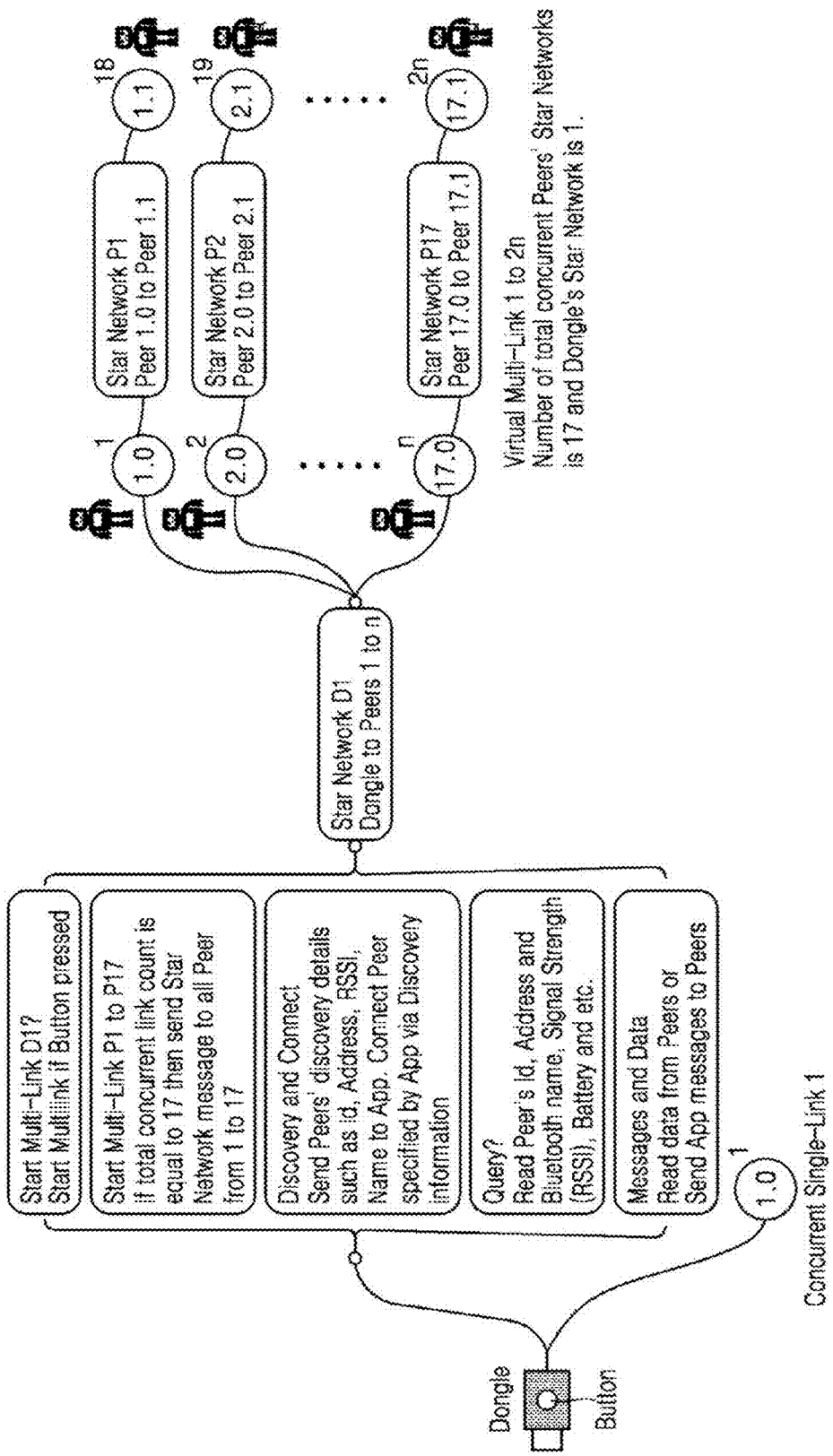
[Figure 2]

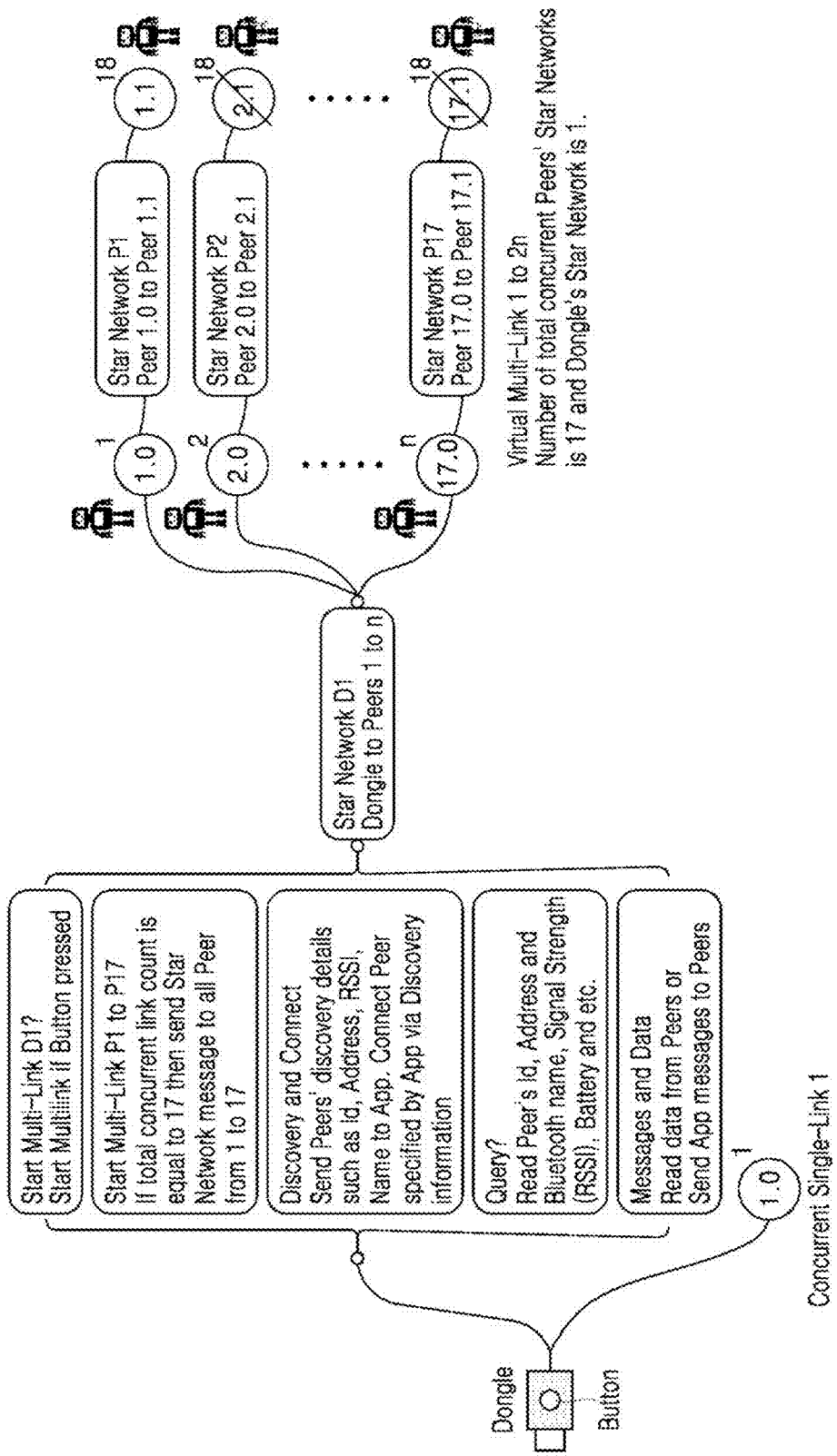
[Figure 3]

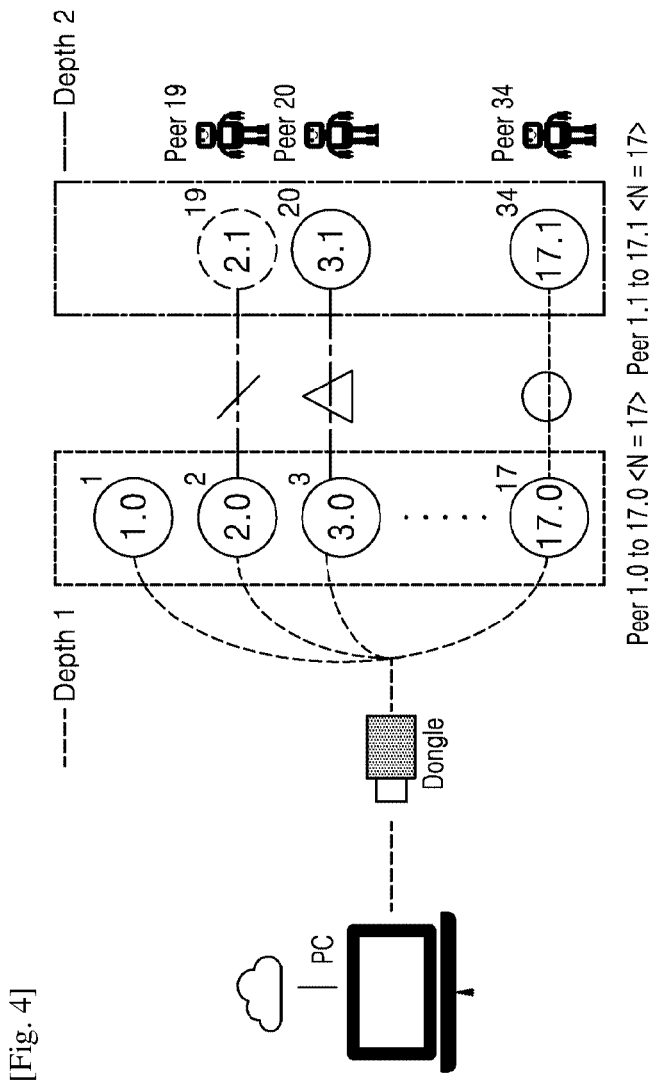

METHOD AND SYSTEM FOR PROVIDING VIRTUAL INTERFACE BY USING STAR NETWORK

CROSS-REFERENCE TO RELATED APPLICATIONS

This application is a National Phase Application of PCT International Application No. PCT/KR2021/018776, which was filed on Dec. 10, 2021, and which claims priority from Korean Patent Application No. 10-2020-0181520 filed on Dec. 23, 2020. The disclosures of the above patent applications are incorporated herein by reference in their entirety.

TECHNICAL FIELD

An embodiment of the present disclosure relates to a method and system for providing virtual interface by using star network.

BACKGROUND ART

The content described below merely provides background information related to the present embodiment and does not constitute the prior art.

In order to utilize a time division multiple access (TDMA) type multiple access protocol, a time synchronization protocol for synchronizing time between communication nodes is essential. To date, various consensus-based distributing protocols have been developed for time synchronization of a wireless ad-hoc network using time division multiple access (TDMA).

The consensus-based distributing protocol has an average consensus algorithm that averages time information of each node and a maximum (minimum) consensus algorithm that synchronizes to a maximum (minimum) time value among each node. The maximum consensus algorithm may operate simpler and faster than the average consensus algorithm, but when a defect occurs or a malicious node is included in a specific node, it requires an abnormally high or low time value due to the corresponding node, so synchronization itself is not performed properly.

For the above reasons, the average consensus algorithm is more preferred than the maximum consensus algorithm for stability despite the relatively slow synchronization speed. The average consensus algorithm may provide higher accuracy than the maximum consensus algorithm.

Average-based consensus distribution algorithms may be classified into two categories: synchronous algorithm and asynchronous algorithm. As the synchronous algorithm, there is a gradient time synchronization protocol (GTSP), and as the asynchronous algorithm, there is an average time synchronization protocol (ATSP).

In the gradient time synchronization protocol (GTSP), a synchronous algorithm, each node is configured to collect timing messages from its nearest neighbors, and then use the timing messages simultaneously to adjust its local clock. In the average time synchronization protocol (ATSP), an asynchronous algorithm, each node is configured to sequentially update its clock whenever it receives timing messages.

DISCLOSURE OF INVENTION

Technical Problem

The object of this embodiment is to provide a method and system for providing virtual interface by using star network forming a multi-link for continuously connecting peers up to a maximum number of connectable peers N after scanning all peers around a dongle, and extending connection to form a virtual multi-link with a new peer using the dongle and an already connected peer when a peer exceeding the maximum number of connectable peers N among the all peers exists.

Solution to Problem

One aspect of this embodiment provides a system for providing virtual interface by using star network includes a user terminal processing messages and data; a dongle connected to the user terminal, generating scan information that scans all peers located nearby, transmitting an advertising report to the user terminal as a discovery request after generating the scan information as the advertising report, and connected to any one of the all peers based on the advertising report under the control of the user terminal; and a peer connecting to the dongle, wherein the dongle forms a multi-link for continuously connecting any one of the all peers up to a maximum number of connectable peers N, and forms a virtual multi-link with a new peer using a peer already connected to the dongle when a peer exceeding the maximum number of connectable peers N among the all peers exists.

Another aspect of this embodiment provides a method for providing virtual interface by using star network includes generating scan information that scans all peers located nearby in a dongle; generating the scan information as an advertising report in the dongle; sending the advertising report to the user terminal as a discovery request in the dongle; connecting to any one of the all peers based on the advertising report under the control of the user terminal in the dongle; forming a multi-link to continuously connect any one of the all peers up to a maximum number of connectable peers N in the dongle, and forming a virtual multi-link with a new peer using a peer already connected to the dongle when a peer exceeding the maximum number of connectable peers N among the all peers exists in the dongle.

Advantageous Effects of Invention

As described above, according to this embodiment, there are effects forming a multi-link for continuously connecting peers up to a maximum number of connectable peers N after scanning all peers around a dongle, and extending connection to form a virtual multi-link with a new peer using the dongle and an already connected peer when a peer exceeding the maximum number of connectable peers N among the all peers exists.

BRIEF DESCRIPTION OF DRAWINGS

FIG. 1 is a diagram illustrating a connection between a dongle and a peer using a single-link and a multi-link according to the present embodiment.

FIG. 2 is a diagram illustrating an extended connection between peers using a virtual multi-link according to a first embodiment.

FIG. 3 is a diagram illustrating an extended connection between peers using a virtual multi-link according to a second embodiment.

FIG. 4 is a diagram illustrating an operation when a signal is weakened or disconnected between peers according to the present embodiment.

BEST MODE FOR CARRYING OUT THE INVENTION

One aspect of this embodiment provides a system for providing virtual interface by using star network includes a user terminal processing messages and data; a dongle connected to the user terminal, generating scan information that scans all peers located nearby, transmitting an advertising report to the user terminal as a discovery request after generating the scan information as the advertising report, and connected to any one of the all peers based on the advertising report under the control of the user terminal; and a peer connecting to the dongle, wherein the dongle forms a multi-link for continuously connecting any one of the all peers up to a maximum number of connectable peers N, and forms a virtual multi-link with a new peer using a peer already connected to the dongle when a peer exceeding the maximum number of connectable peers N among the all peers exists.

Another aspect of this embodiment provides a method for providing virtual interface by using star network includes generating scan information that scans all peers located nearby in a dongle; generating the scan information as an advertising report in the dongle; sending the advertising report to the user terminal as a discovery request in the dongle; connecting to any one of the all peers based on the advertising report under the control of the user terminal in the dongle; forming a multi-link to continuously connect any one of the all peers up to a maximum number of connectable peers N in the dongle, and forming a virtual multi-link with a new peer using a peer already connected to the dongle when a peer exceeding the maximum number of connectable peers N among the all peers exists in the dongle.

MODE FOR THE INVENTION

Hereinafter, this embodiment will be described in detail with reference to the accompanying drawings.

FIG. 1 is a diagram illustrating a connection between a dongle and a peer using a single-link and a multi-link according to the present embodiment.

A system for providing virtual interface according to this embodiment includes a dongle 110, a user terminal 120 and a peer 130. Components included in the system for providing virtual interface are not necessarily limited thereto.

The dongle 110 is connected to a plurality of peers 130 by being coupled to the user terminal 120. The dongle 110 is coupled to the user terminal 120 to perform connect and scan request to the peer 130.

The dongle 110 scans a peer 130 located nearby using Bluetooth low energy (BLE). The dongle 110 scans all peers 130 advertising itself.

The dongle 110 generates a searched robot information as an advertising report. The dongle 110 generates the robot information including at least one of ID, address, received signal strength indication (RSSI), and name information for the scanned peer 130 as advertising information.

The dongle 110 sends the advertising report to the user terminal 120 or a cloud server. The dongle 110 transmits a discovery request to the user terminal 120 or the cloud server to request a connection to the scanned peer 130 using the advertising report. The dongle 110 transmits ID, address, received signal strength indication (RSSI), and name information included in the discovery request to the user terminal 120 and the cloud server.

For example, the discovery request includes 'addr 7c:5e:41:7e:6e rssi-50 GENI WaterMelon', 'addr a8:db: b8:21:13 rssi-61 GENI Banana', 'addr 95:70:cd:c4:02 rssi-54 GENI Apple', 'addr 42:e5:1d: e7:02 rssi-57 GENI Candy' as ID, address, received signal strength indication (RSSI), name information.

In other words, the dongle 110 is coupled to the user terminal 120 and generates scan information that scans the all peers located nearby. The dongle 110 generates the scan information as the advertising report. The dongle 110 transmits the advertising report to the user terminal 120 as the discovery request. The dongle 110 is connected to any one of the all peers based on the advertising report under the control of the user terminal 120.

The dongle 110 forms a multi-link for continuously connecting any one of the all peers up to a maximum number of connectable peers N. If a peer exceeding the maximum number of connectable peers N among the all peers exists, the dongle 110 uses a peer already connected with the dongle 110 to form a virtual multi-link with a new peer.

The user terminal 120 means an electronic device capable of receiving various web page data via a network according to a key operation of a user. The user terminal 120 may be any one of a tablet PC, a laptop, a personal computer (PC), a smart phone, a personal digital assistant (PDA), and a mobile communication terminal.

The user terminal 120 checks whether the maximum number of connectable peers N is less than a total link count (N<total link count). Here, the total link count may be set by the user. The maximum number of connectable peers N is determined by a value allocated due to a memory limit of a Bluetooth stack in a star network.

The user terminal 120 sends and receives message and data with the peer 130 via the dongle 110.

If the maximum number of connectable peers N is confirmed to be less than the total link count, the user terminal 120 uses the dongle 110 to restart the scan for the peer 130. Each dongle 110 may physically connect the peer 130 up to a preset number N (e.g., 17).

The user terminal 120 allows the dongle 110 to connect with the peer 130. The user terminal 120 allows the dongle 110 to select and connect to one peer 130 among a plurality of peer discovery information included in the discovery request by the user's command or selection.

The user terminal 120 allows the dongle 110 to select and connect the one peer 130 among the plurality of peer discovery information included in the discovery request by the user's command or selection with a single-link. The user terminal 120 allows the dongle 110 to select the one peer 130 among the plurality of peer discovery information included in the discovery request to connect as many as the maximum number of connectable peers N by the user's command or selection with a multi-link.

The user terminal 120 selects the one peer 130 among the plurality of peer discovery information included in the discovery request in the order of signal strength to connect as many as the maximum number of connectable peers N with the multi-link.

In other words, the user terminal 120 receives the advertising report including ID, address, received signal strength indication (RSSI), and name information for the all peers scanned from the dongle 110.

The user terminal 120 checks whether the maximum number of connectable peers N for the dongle 110 is less than the total link count (N<total link count).

If the maximum number of connectable peers N is confirmed to be less than the total link count, the user terminal 120 repeats a loop for continuously multi-linking any one of the all peers up to the maximum number of connectable peers N.

If the maximum number of connectable peers N is confirmed to be greater than or equal to the total link count (N>=total link count), the user terminal 120 reads data from some or all peers connected up to the maximum number of connectable peers N by using the dongle 110, or transmits the message to some or all peers connected up to the maximum number of connectable peers N.

The user terminal 120 transmits connection information to dongle 110 after being connected to the one peer among the peer discovery information (e.g., addr a8:db:b8:21:13 rssi-61 GENI Banana).

The user terminal 120 checks whether the maximum number of connectable peers N is less than the total link count (N<total link count).

When the maximum number of connectable peers N is confirmed to be greater than or equal to the total link count (N>=total link count), the user terminal 120 recognizes that the maximum number of connectable peers N of the peer 130 connected to the dongle 110 are all connected as much as the total link count, and sends messages and data to the peer 130 via dongle 110. After that, the user terminal 120 receives message and data from the peer 130 via the dongle 110.

User terminal 120 reads data from some or all peers 130, broadcasts message to all peers 130, or sends message to individual peer 130.

The peer 130 connects to the dongle 110. The peer 130 may be implemented as a robot.

FIG. 2 is a diagram illustrating an extended connection between peers using a virtual multi-link according to a first embodiment.

When there is a push input on a button provided on a body, the dongle 110 starts to operate as the multi-link, scans all peers located nearby, and collects ID, address, received signal strength indication (RSSI), name information for all peers, and generates the advertising report.

When the dongle 110 operates as the multi-link, it forms the multi-link from a first peer to a N-th peer corresponding to the maximum number of connectable peers N using the star network.

The dongle 110 forms the multi-link with a primary depth by connecting the first peer to the N-th peer among all peers by the maximum number of connectable peers N.

If a peer exceeding the maximum number of connectable peers N among the all peers exists, the dongle 110 uses the peer already connected with the dongle 110 to form the virtual multi-link with the remaining peer that is not yet connected.

The dongle 110 connects the remaining peer that is not yet connected except the peer already connected with the dongle 110 among the all peers 1:1 with the peer already connected with the dongle to form the virtual multi-link with the primary depth.

The single-link means a process in which the dongle 110 connected to the user terminal 120 is connected to only one peer among the plurality of peers. The multi-link refers to a loop process in which the dongle 110 connected to the user terminal 120 is continuously connected with peers up to the maximum number of connectable peers N. The virtual multi-link refers to a process in which the dongle 110 connected to the user terminal 120 extends connection to the new peer using the peer already connected with the dongle 110 when the peer exceeding the maximum number of connectable peers N exists. Here, the peer already connected with the dongle 110 is extended connection 1:1 to only one new peer.

The dongle 110 according to the first embodiment has the button. If there is the push input for the button, the dongle 110 operates as the multi-link. If there is no push input for the button, the dongle 110 operates as the single-link.

If there is the input for the provided button, the dongle 110 starts the multi-link. The dongle 110 scans a first peer to a 2N-th peer (e.g., 34-th peer), which are all peers in the vicinity.

The dongle 110 connects from the first peer to the N-th peer by the multi-link. When the maximum number of connectable peers N is connected by the total link count (e.g., 17), the dongle 110 form the multi-link from the first peer to the N-th peer (e.g., 17) for a star network message.

The dongle 110 performs discovery and connect from the first peer to the N-th peer. The dongle 110 transmits search details such as ID, address, received signal strength indication (RSSI) and name information to the user terminal 120. The user terminal 120 connects the first peer to the N-th peer with the dongle 110 using the search detail.

The dongle 110 confirms a query. The dongle 110 reads ID, address and Bluetooth name, received signal strength indication (RSSI), and battery of the peer 130 in response to a user request.

The dongle 110 processes messages and data. The dongle 110 reads data from the first peer to N-th peer forming the multi-link or transmits messages to control the first peer or N-th peer.

When operating as the multi-link, the dongle 110 forms the multi-link from the first peer to the N-th peer using the star network D1.

In the Bluetooth low energy (BLE), physical limitations or the Bluetooth stack are limited in the implementation of star network. By using the Bluetooth stack mounted on the limited Bluetooth low energy (BLE) chip, it is possible to overcome the limitations of the Bluetooth stack and connect with more than allowed robots.

If there is an 18-th peer (peer 1.1) exceeding the maximum number of connectable peers N, the first peer (peer 1.0) is connected 1:1 with the 18-th peer (peer 1.1) by using a first star network (star network P1) as the virtual multi-link.

If there is a 19-th peer (peer 2.1) exceeding the maximum number of connectable peers N, a second peer (peer 2.0) is connected 1:1 to the 19-th peer (peer 2.1) by using a second star network (star network P2) as the virtual multi-link.

If there is the 34-th peer (peer 2.1) exceeding the maximum number of connectable peers N, a 17-th peer (peer 17.0) is connected 1:1 to the 34-th peer (Peer 2.1) by using a 17-th star network (star network P17) as the virtual multi-link.

When there is a robot exceeding the maximum number of connectable peers N, the dongle 110 according to the first embodiment allows a previously connected robot to connect (2N) up to twice the number (N) in 1:1 with a new robot.

The dongle 110 scans all peers therearound (e.g., a total of 34 peers).

When the dongle 110 according to the first embodiment is connected to the 17-th peer, which is the maximum number of connectable peers N, it transmits a command (18-th peer address) to the first peer already connected with the dongle 110 to extend connection with the 18-th peer among the remaining peers that are not yet connected.

The dongle 110 according to the second embodiment preferably transmits a command to the already connected first peer to connect by specifying the 18-th peer among the remaining peers that are not yet connected, but is not necessarily limited thereto, may transmit a command to the already connected first peer to connect any one of the remaining peers that are not yet connected.

The first peer discovers according to the dongle 110's command, finds the 18-th peer among the remaining peers, and expands connection to the virtual multi-link. The first peer transmits the extended connection result with the 18-th peer (18-th peer ID: given a lower ID connected to the first peer, 18-th peer address) to the dongle 110. After receiving the extended connection result with the 18-th peer from the first peer, the dongle 110 checks the remaining peer that is not yet connected among all peers.

After receiving the connection result with the extended-connected peer from the already connected peer, the dongle 110 according to the second embodiment selects a peer connected by the same peer address as a duplicate connection peer when the same peer address exists. The dongle 110 may send an extended connection command to connect with the remaining peer again to the remaining peer except for one of the duplicate connection peers.

When it is confirmed that the remaining peer that is not yet connected exists, the dongle 110 according to the first embodiment transmits a command to the already connected second peer to extend connection with the 19-th peer among the remaining peers that are not yet connected (19-th peer address).

The dongle 110 according to the second embodiment preferably transmits a command to the already connected second peer to connect by specifying the 19-th peer among the remaining peers that are not yet connected, but is not necessarily limited thereto, may transmit a command to the already connected second peer to connect any one of the remaining peers that are not yet connected.

The second peer discovers according to the dongle 110's command, finds the 19-th peer among the remaining peers, and expands connection to the virtual multi-link. The second peer transmits the extended connection result with the 19-th peer (19-th peer ID: given a lower ID connected to the second peer, 19-th peer address) to the dongle 110. After receiving the extended connection result with the 19-th peer from the second peer, the dongle 110 checks the remaining peer that is not yet connected among all peers.

After receiving an extended connection result with a 2N–1-th peer (e.g., 33-th peer) from a N–1-th peer (e.g., 16-th peer), the dongle 110 checks the remaining peer that is not yet connected among all peers.

When it is confirmed that the remaining peer that is not yet connected exists, the dongle 110 according to the first embodiment transmits a command (2N-th peer address) to an already connected N-th peer (e.g., 17-th peer) to extend connection with a 2N-th peer (e.g., 34-th peer) among the remaining peers that are not yet connected.

The dongle 110 according to the second embodiment preferably transmits a command to the already connected N-th peer to connect by specifying the 2N-th peer among the remaining peers that are not yet connected, but is not necessarily limited thereto, may transmit a command to the already connected N-th peer to connect any one of the remaining peers that are not yet connected.

The N-th peer (e.g., 17-th peer) is discovered according to the dongle 110's command, finds the 2N-th peer (e.g., 34-th peer) among the remaining peers, and extends connection to the virtual multi-link.

The N-th peer (e.g., 17-th peer) transmits the extended connection result with the 2N-th peer (e.g., 34-th peer) (2N-th peer ID: given a lower ID connected to the N-th peer, 2N-th peer address) to the dongle 110.

After receiving the extended connection result with the 2N-th peer (e.g., 34-th peer) from the N-th peer (e.g., 17-th peer), the dongle 110 checks the remaining peer that is not yet connected among all peers. If it is confirmed that the remaining peer that is not yet connected does not exist, the dongle 110 stops the command to extend connection.

When the connection to the peer corresponding to the maximum number of connectable peers N is completed, the dongle 110 according to the first embodiment transmits a command to the first peer among the already connected peers to expand connection with a specific peer that is any one of the remaining peers that are not yet connected.

The first peer among the already connected peers according to the first embodiment discovers the nearby peer according to the peer address received from the dongle 110, then finds the specific peer corresponding to the peer address among the remaining peers that are not yet connected, and extends connection to the virtual multi-link.

The first peer among the already connected peers according to the first embodiment gives the ID for the specific peer as the lower ID connected to the first peer among the already connected peers, and transmits the extended connection result including the specific peer address to the dongle 110.

When the connection is completed up to the peer corresponding to the maximum number of connectable peers N, the dongle 110 according to the first embodiment transmits a command in the order to the second peer to the last peer among the already connected peers to extend connection with the specific peer that is any one of the remaining peers that are not yet connected.

The second peer to the last peer among the already connected peers according to the first embodiment discover the nearby peer according to the peer address received from the dongle 110, then find the specific peer corresponding to the peer address among the remaining peers that are not yet connected, and extend connection to the virtual multi-link.

The second peer to the last peer among the already connected peers according to the first embodiment gives the ID for the specific peer as the lower ID connected to the first peer among the already connected peers, and transmit the extended connection result including the specific peer address to the dongle 110.

FIG. 3 is a diagram illustrating an extended connection between peers using a virtual multi-link according to a second embodiment.

The dongle 110 according to the second embodiment has a button. If there is a push input for the button, the dongle 110 operates as the multi-link. If there is no push input for the button, the dongle 110 operates as the single-link.

If there is the input for the provided button, the dongle 110 starts the multi-link. The dongle 110 scans a first peer to a 2N-th peer (e.g., 34-th peer), which are all peers in the vicinity.

The dongle 110 connects from the first peer to the N-th peer by the multi-link. When the maximum number of connectable peers N is connected by the total link count (e.g., 17), the dongle 110 form the multi-link from the first peer to the N-th peer (e.g., 17) for a star network message.

The dongle 110 performs discovery and connect from the first peer to the N-th peer. The dongle 110 transmits search details such as ID, address, received signal strength indication (RSSI) and name information to the user terminal 120. The user terminal 120 connects the first peer to the N-th peer with the dongle 110 using the search detail.

The dongle 110 confirms a query. The dongle 110 reads ID, address and Bluetooth name, received signal strength indication (RSSI), and battery of the peer 130 in response to a user request.

The dongle 110 processes messages and data. The dongle 110 reads data from the first peer to N-th peer forming the multi-link or transmits messages to control the first peer or N-th peer.

When operating as the multi-link, the dongle 110 forms the multi-link from the first peer to the N-th peer using the star network D1.

In Bluetooth low energy (BLE), physical limitations or Bluetooth stack are limited in the implementation of star network. By using the Bluetooth stack mounted on the limited Bluetooth low energy (BLE) chip, it is possible to overcome the limitations of the Bluetooth stack and connect with more than allowed robots.

After the multi-link connection is completed up to the 17-th peer, which is the maximum number of connectable peers N, the dongle 110 checks whether unconnected peer exists among the nearby all peers. If it is confirmed that the unconnected peer exists among the nearby all peers, the dongle 110 send a command to the already connected first peer (peer 1.0) to 17-th peer (peer 17.0) to connect any one of the remaining peers that are not yet connected.

The first peer (peer 1.0) to the 17-th peer (peer 17.0) already connected with the dongle 110 discovers according to the dongle 110's command, and extends connection to the peer discovered based on the signal strength among the remaining peers that are not yet connected with the virtual multi-link.

The first peer (peer 1.0) to the 17-th peer (peer 17.0) already connected with the dongle 110 transmits the extended connection result (peer address) with the peer discovered based on the signal strength to the dongle 110.

The dongle 110 receives the extended connection result with the remaining peer from the already connected first peer (peer 1.0) to 17-th peer (peer 17.0). Thereafter, the dongle 110 analyzes the extended connection result and checks whether the same peer address exists. If it is confirmed that the same peer address exists, the dongle 110 selects the peer connected by the same peer address as a duplicate connection peer.

The dongle 110 may send an extended connection command to connect with the remaining peer again to the remaining peer except for one of the duplicate connection peers. For example, when it is confirmed that all of the first peer (peer 1.0), second peer (peer 2.0), and 17-th peer (peer 17.0) extend connection with the 18-th peer (18-th peer address), the dongle 110 selects the first peer (peer 1.0), second peer (peer 2.0), and 17-th peer (peer 17.0) as the duplicate connection peers.

The dongle 110 may transmit an extended connection command to the second peer (peer 2.0) and 17-th peer (peer 17.0) excluding the first peer (peer 1.0) among the duplicate connection peers including the first peer (peer 1.0), second peer (peer 2.0), 17-th peer (peer 17.0) to connect with the remaining peer again.

The dongle 110 according to the second embodiment connects to the peer corresponding to the maximum number of connectable peers N by multi-link, and then checks whether the remaining peer that is not yet connected among all peers exists.

When it is confirmed that the peer that is not yet connected exists, the dongle 110 according to the second embodiment transmits a command to all already connected peers to connect any one of the remaining peers that are not yet connected.

After receiving the extended connection result with the extended-connected peer from all of the already connected peers, the dongle 110 according to the second embodiment selects the peer connected by the same peer address as the duplicate connection peer when the same peer address exists.

The dongle 110 according to the second embodiment transmits an extended connection command to the remaining peers except for one peer among the duplicate connection peers to connect with the remaining peer again.

FIG. 4 is a diagram illustrating an operation when a signal is weakened or disconnected between peers according to the present embodiment.

The dongle 110 allows up to 2N peers to form the virtual multi-link using the star network. The dongle 110 broadcasts the message to the first peer to the N-th peer (e.g., 17-th peer), and observes the message of each peer. If the total link count matches N (e.g., 17), the dongle 110 transmits the message to the first peer to 2N-th peer (e.g., 17-th peer) so that each peer starts the star network that connects peer-to-peer at a hierarchical secondary depth.

The dongle 110 provides a virtual interface diagram based on the star network for LIMS. A maximum of 2N (e.g., 34) total virtual links in which the plurality of peers is directly connected to one host, the dongle 110, at the primary depth are connected.

If a total number of links in a first depth (depth 1) match perfectly, the dongle 110 sends the message to each peer to start the star network to connect the other peers being advertised.

When a disconnection or long range detection event occurs, the peer existing in the primary depth or a secondary depth reports to the dongle 110 using the star network.

The first depth is the primary depth, and simultaneously connects the first peer (peer 1.0) to the 17-th peer (peer 17.0). A second depth is the secondary depth, and simultaneously connects the 18-th peer (peer 1.1) to 34-th peers (peer 17.1) using the star network.

When a GAP disconnection event in which the link with the 19-th peer (peer 19) is disconnected occurs, the second peer (peer 2) delivers the GAP disconnection event to the first peer (peer 1) and dongle 110 using the star network.

The dongle 110 transmits the GAP disconnection event to the user terminal 120. The user terminal 120 recognizes that the extended connection to the second peer (peer 2) is disconnected, and sends a command to the second peer again to extend connection to any one of the remaining unconnected peers or a command to the 19-th peer again to extend connection.

In other words, when the GAP disconnection event in which the link with the extended-connected peer is disconnected occurs, the peer already connected to the dongle 110 transmits the GAP disconnection event to the dongle 110 by using the star network. The dongle 110 transmits the GAP disconnection event to the user terminal 120. The user terminal 120 recognizes that the extended connection to the already connected peer is disconnected based on the GAP disconnection event, and transmits a command to the already connected peer again to extend connection to any one of the remaining unconnected peers or a command to the extended-connected peer to reconnect.

When a signal strength with a 20-th peer (peer 20) is weakened, a third peer (peer 3) recognizes that the connection is weakened and transmits information about the 20-th peer to the dongle 110. In other words, the third peer (peer 3) checks a GAP event and transmits to the dongle 110 that the signal strength is weak when a received signal strength indication (RSSI) signal with the 20-th peer (peer 20) is lower than −90 dBm.

The user terminal 120 recognizes that the extended connection signal to the third peer (peer 2) is weakened, and waits for a preset time to monitor whether the extended connection signal to the third peer is strong again or disconnected.

In other words, when the signal strength with the extended-connected peer is weakened, the peer already connected to the dongle 110 transmits to the dongle 110 that the signal strength is weakened. The dongle 110 transmits to the user terminal 120 that the signal strength for the extended-connected specific peer is weak. The user terminal 120 recognizes that the signal strength for the extended-connected specific peer is weakened, and waits for the preset time to monitor whether the extended connection signal to the extended-connected specific peer is strong again or disconnected.

The 34-th peer (peer 34) sends the message to the 17-th peer (peer 17). After receiving the message from the 34-th peer (peer 34), the 17-th peer (peer 17) transmits the message to the dongle 110 by using an async wait thread.

The above description is merely illustrative of the technical idea of this embodiment, and a person skilled in the art to which this embodiment belongs may make various modifications and variations without departing from the essential characteristics of the present embodiment. Accordingly, the present embodiments are intended to explain rather than limit the technical spirit of the present embodiment, and the scope of the technical spirit of the present embodiment is not limited by these embodiments. The protection scope of this embodiment should be interpreted by the claims below, and all technical ideas within the equivalent range should be interpreted as being included in the scope of the present embodiment.

The invention claimed is:

1. A system for providing virtual interface by using star network, the system comprising:
    a user terminal processing messages and data;
    a dongle connected to the user terminal, generating scan information that scans all peers located nearby, transmitting an advertising report to the user terminal as a discovery request after generating the scan information as the advertising report, and connected to any one of the all peers based on the advertising report under the control of the user terminal; and
    a peer connecting to the dongle,
    wherein the dongle forms a multi-link for continuously connecting any one of the all peers up to a maximum number of connectable peers N, and forms a virtual multi-link with a new peer using a peer already connected to the dongle when a peer exceeding the maximum number of connectable peers N among the all peers exists;
    wherein the user terminal receives the advertising report including ID, address, received signal strength indication (RSSI), name information for all peers scanned from the dongle,
    checks whether the maximum number of connectable peers N for the dongle is less than a total link count (N<total link count), and
    repeats a loop continuously multi-linking any one of the all peers up to the maximum number of connectable peers N when the maximum number of connectable peers N is confirmed to be less than the total link count;
    wherein the user terminal, when the maximum number of connectable peers N is confirmed as more than the total link count (N>=total link count), reads data from some or all peers connected up to the maximum number of connectable peers N by using the dongle, or transmits the message to some or all peers connected up to the maximum number of connectable peers N;
    wherein the dongle starts to operate as the multi-link when there is a push input on a button provided on a body, and scans the all peers located nearby, collects ID, address, received signal strength indication (RSSI), name information for the all peers, and generates the advertising report;
    wherein the dongle forms the multi-link from a first peer to a N-th peer corresponding to the maximum number of connectable peers N using a star network when operating as the multi-link;
    wherein the dongle forms the multi-link with a primary depth by connecting the first peer to the N-th peer among the all peers by the maximum number of connectable peers N; and
    wherein the dongle forms a virtual multi-link with remaining peer that is not yet connected using the peer already connected to the dongle when the peer exceeding the maximum number of connectable peers N among the all peers exists.

2. The system of claim 1, wherein the dongle forms the virtual multi-link with primary depth by connecting the remaining peer that is not yet connected except for the peer already connected to the dongle among the all peers 1:1 with the peer already connected to the dongle.

3. The system of claim 1, wherein the dongle transmits a command to a first peer among the already connected peers to extend connection with a specific peer that is any one of the remaining peers that are not yet connected when the connection to the peer corresponding to the maximum number of connectable peers N is completed.

4. The system of claim 1, wherein the first peer among the already connected peers discovers the nearby peer according to a peer address received from the dongle, finds a specific peer corresponding to the peer address among the remaining peers that are not yet connected, and extends connection to the virtual multi-link, gives ID for the specific peer as a lower ID connected to the first peer among the already connected peers, and sends an extended connection result including the specific peer address to the dongle.

5. The system of claim 1, wherein the dongle sends a command to a second peer to a last peer among the already connected peers sequentially to extend connection with a specific peer that is any one of the remaining peers that are not yet connected when the connection to the peer corresponding to the maximum number of connectable peers N is completed.

6. The system of claim 1, wherein the second peer to the last peer among the already connected peers discovers the nearby peer according to a peer address received from the dongle, finds the specific peer corresponding to the peer address among the remaining peers that are not yet connected, and extends connection to the virtual multi-link, gives ID for the specific peer as a lower ID connected to the first peer among the already connected peers, and sends an extended connection result including the specific peer address to the dongle.

7. The system of claim 1, wherein the dongle checks whether there is the remaining peer that is not yet connected among the all peers after connecting to the peer corresponding to the maximum number of connectable peers N through the multi-link, and sends a command to all of the already connected peers to connect any one of the remaining peers that are not yet connected when it is confirmed that there is the peer that is not yet connected.

8. The system of claim 1, wherein the dongle receives the extended connection result with the extended-connected peer from all of the already connected peers, and selects the peer connected to the same peer address as a duplicate connection peer when the same peer address exists. sends an extended connection command to the remaining peers except for one of the duplicate connection peers to connect with the remaining peer again.

9. The system of claim 1, wherein the already connected peer transmits a GAP disconnection event to the dongle using the star network when the GAP disconnection event in which a link with the extended-connected peer is disconnected occurs, the dongle transmits the GAP disconnection event to the user terminal, and the user terminal recognizes that the extended connection to the already connected peer is disconnected based on the GAP disconnection event, and sends a command to the already connected peer to extend connection with any one of the remaining unconnected peers again or a command to the extended-connected peer to reconnect.

10. The system of claim 1, wherein the already connected peer transmits to the dongle that signal strength with the extended-connected peer is weakened when the signal strength is weakened, the dongle transmits to the user terminal that the signal strength for the extended-connected specific peer is weakened, and the user terminal recognizes that the signal strength for the extended-connected specific peer is weakened, waits for a preset time and monitors whether an extended connection signal for the extended-connected specific peer is strengthened again or disconnected.

11. A method for providing virtual interface by using star network, the method comprising:
generating scan information that scans all peers located nearby in a dongle;
generating the scan information as an advertising report in the dongle;
sending the advertising report to a user terminal as a discovery request in the dongle;
connecting to any one of the all peers based on the advertising report under the control of the user terminal in the dongle;
forming a multi-link to continuously connect any one of the all peers up to a maximum number of connectable peers N in the dongle, and forming a virtual multi-link with a new peer using a peer already connected to the dongle when a peer exceeding the maximum number of connectable peers N among the all peers exists in the dongle;
wherein the user terminal receives the advertising report including ID, address, received signal strength indication (RSSI), name information for all peers scanned from the dongle,
checks whether the maximum number of connectable peers N for the dongle is less than a total link count (N<total link count), and
repeats a loop continuously multi-linking any one of the all peers up to the maximum number of connectable peers N when the maximum number of connectable peers N is confirmed to be less than the total link count;
wherein the user terminal, when the maximum number of connectable peers N is confirmed as more than the total link count (N>=total link count), reads data from some or all peers connected up to the maximum number of connectable peers N by using the dongle, or transmits a message to some or all peers connected up to the maximum number of connectable peers N;
wherein the dongle starts to operate as the multi-link when there is a push input on a button provided on a body, and scans the all peers located nearby, collects ID, address, received signal strength indication (RSSI), name information for the all peers, and generates the advertising report;
wherein the dongle forms the multi-link from a first peer to a N-th peer corresponding to the maximum number of connectable peers N using a star network when operating as the multi-link;
wherein the dongle forms the multi-link with a primary depth by connecting the first peer to the N-th peer among the all peers by the maximum number of connectable peers N; and
wherein the dongle forms a virtual multi-link with remaining peer that is not yet connected using the peer already connected to the dongle when the peer exceeding the maximum number of connectable peers N among the all peers exists.

* * * * *